Patented Oct. 13, 1936

2,057,318

UNITED STATES PATENT OFFICE 2,057,318

INTERNAL COMBUSTION ENGINE

Karl Schwaiger, Gaggenau/Baden, Germany, assignor to Daimler-Benz Aktiengesellschaft, Stuttgart-Unterturkheim, Germany, a company of Germany Application August 24, 1934, Serial No. 741,344
In Germany August 25, 1933

1 Claim. (Cl. 123—30)

This invention relates to switching means for heating devices for heating internal combustion engines, more particularly the precombustion chambers of Diesel engines, operated with tar oil and the invention consists substantially in this that the heating means is normally placed into operation only during the starting up of the engine, during idle running or when the engine is operating at low speeds by means of a regulating member, the operation of which is dependent on the load or the speed, for instance by being arranged for operation by the accelerator pedal or a governor. The regulation may take place in stages or steps.

The invention has primarily for its object to enable heavy tar oils of the aromatic series or the like to be employed for operating Diesel engines, the atomization and combustion of which, particularly during idle running and at low speeds of revolution, causes difficulties.

Figure 1:
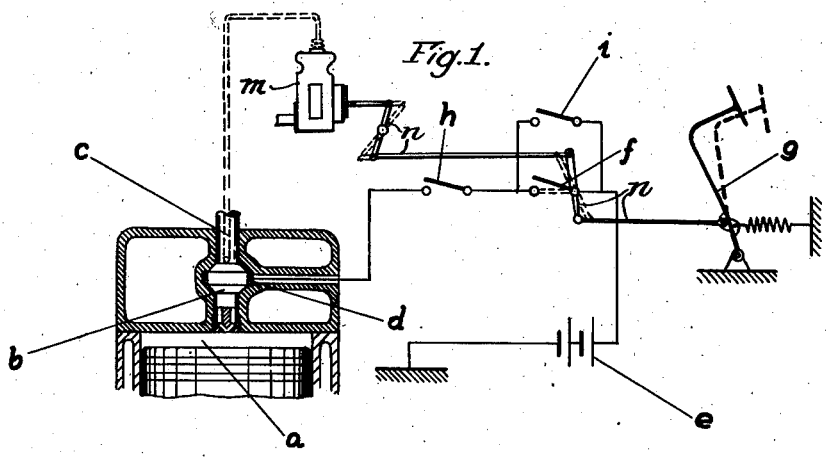
Figure 2:
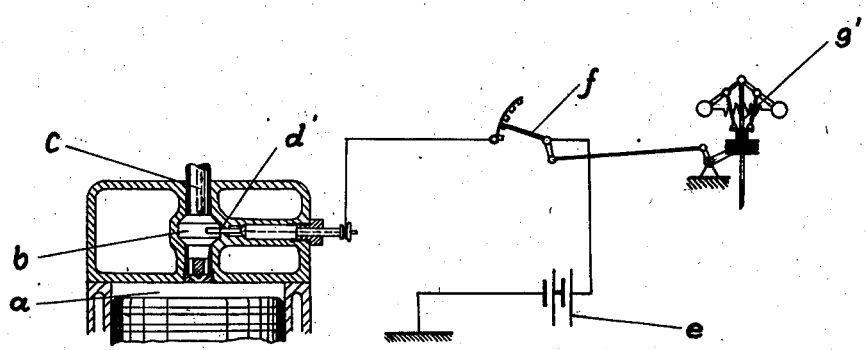

In Figures 1 and 2 of the drawing, two diagrammatic arrangements for heating a precombustion chamber are illustrated.

Figure 3:
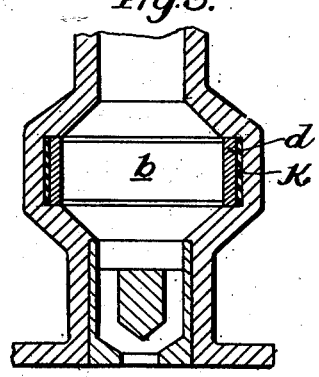

Figure 3 is a vertical section of a detail of Figure 1 on an enlarged scale.

Referring to the drawing, $a$ is the engine cylinder into which the fuel is injected through a precombustion chamber $b$ by means of the nozzle $c$, the precombustion chamber being preferably cooled. A heating device $d$ surrounds the precombustion chamber, for instance annularly, said heating device preferably forming the wall of the precombustion chamber and being constructed in the form of an electrically heated incandescent ring, the material of which has a high thermal conductivity and at the same time is capable of offering considerable resistance to the action of heat, being composed for instance of beryllium bronze or the like. Further, the incandescent ring is preferably protected from the cooled outer wall by an effective insulation ring $k$ (as shown in Fig. 3), for instance by means of mica, asbestos or the like, in order to prevent any appreciable conduction of the heat from the incandescent ring to the cooling water. The precombustion chamber itself and preferably also the injection insertion fitted to the precombustion chamber and provided for instance with a core piece, are preferably made of steel having the lowest possible heat conducting properties in order that the incandescent ring may be maintained at a particularly high temperature even when in operation.

The current for the heating device is supplied from a suitably designed battery or by means of the lighting dynamo which may, for instance, be somewhat larger than usual. In the connections a switch $f$ is arranged which, for instance, is connected up to the accelerator pedal $g$ in such a manner that when the pedal is depressed into the idle running position or is moved past a certain position for operating the engine at a low load, the circuit is closed and the heating device is placed into operation. The accelerator pedal $g$, of course, also controls the operation of a conventional motor fuel pump $m$ through the linkage $n$ for introducing a fuel charge into the precombustion chamber $b$. The fuel pump is driven from the engine and may be of any suitable known construction. In Fig. 1, I have shown the accelerator $g$ and portions of its linkage $n$ in dotted lines to illustrate the position these elements occupy when the engine is idling. In this position of the accelerator, the switch $f$ is closed, and if the master switch $h$ is also closed, current will flow through the circuit to the electric heating device. On the other hand, when the accelerator $g$ and its associated linkage $n$ are in the position shown in full lines in Fig. 1, in which position an increased or running charge of fuel will be injected into the precombustion chamber, the switch $f$ will be thrown open, thereby cutting off the supply of current to the electric heating device. As may be seen from Fig. 1, a portion of the linkage $n$ connecting the accelerator to the fuel pump for actuating the latter, also serves as a connecting means between the accelerator and the switch $f$ whereby upon depressing the accelerator to provide a running fuel charge for the engine the switch $f$ will be simultaneously thrown open.

In the drawing two further switches $h$ and $i$ are shown diagrammatically, the current being entirely cut off when the switch $h$ is open, while when the switches $h$ and $i$ are closed the current flows continuously. The switch $i$ is arranged in a shunt circuit which by-passes the switch $f$ in order to be independent of the regulation by the pedal $g$. The arrangement could, of course, be differently devised. A continuous switching-off of the heating current for the incandescent heating device is required, for instance, during long hill climbs, for protecting the batteries or the like. By means of the invention also the necessity for operating with two fuels, that is to say, for operating with a light fuel during idle running or when starting and with tar oil at high speeds and the comparatively complicated change-over devices, such as have been proposed for operation with tar oil, is avoided.

Instead of an incandescent ring, other suitable heating devices, for instance, incandescent spirals, heating pins projecting into the precombustion chamber or the main combustion chamber, may be employed.

With regard to the particular construction of the heating device and the precombustion chamber, the invention is not limited solely to arrangements used in combination with regulating means for the heating current but also extends to such constructions independently of the control of the current.

Another switch arrangement is shown in Figure 2, which differs from the arrangement shown in Figure 1 mainly by the switch $f$ being actuated by a governor $g'$, the operation of which is dependent on the speed of the engine and by the heating device comprising an incandescent pin $d'$ provided in the precombustion chamber.

What I claim is:—

In an internal combustion engine having a combustion chamber and a precombustion chamber arranged above and spaced from said combustion chamber, a restricted passageway placing said chambers in communication, an accelerator for controlling the introduction of motor fuel into said precombustion chamber, an electric heating device arranged in said precombustion chamber for heating the fuel when the latter enters said chamber, an electric circuit for delivering electric current to said heating device, a switch arranged in said circuit, and means operatively connecting said switch to said accelerator for controlling the opening and closing of said switch upon movement of said accelerator, said last-mentioned means being constructed and arranged to close the switch when the accelerator is in a position to supply the idling charge of fuel and to open said switch when the accelerator is in a position to supply the running charge of fuel.

KARL SCHWAIGER.